(12) United States Patent
Honma et al.

(10) Patent No.: US 10,371,808 B2
(45) Date of Patent: Aug. 6, 2019

(54) POSITIONING SENSOR AND DIRECTION ESTIMATION METHOD

(71) Applicant: Panasonic Intellectual Property Management Co., Ltd., Osaka (JP)

(72) Inventors: Naoki Honma, Iwate (JP); Dai Sasakawa, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 15/391,832

(22) Filed: Dec. 27, 2016

(65) Prior Publication Data

US 2017/0205502 A1 Jul. 20, 2017

(30) Foreign Application Priority Data

Jan. 15, 2016 (JP) .................. 2016-006651
Jun. 3, 2016 (JP) .................. 2016-112251

(51) Int. Cl.
*G01S 7/41* (2006.01)
*G01S 7/35* (2006.01)
(Continued)

(52) U.S. Cl.
CPC .............. *G01S 13/42* (2013.01); *G01S 7/354* (2013.01); *G01S 7/415* (2013.01); *G01S 13/003* (2013.01); *G01S 13/88* (2013.01)

(58) Field of Classification Search
CPC ................................ G01S 7/354; G01S 13/42
(Continued)

(56) References Cited

U.S. PATENT DOCUMENTS

2010/0207804 A1 8/2010 Hayward et al.
2013/0335257 A1 12/2013 Abrahamson
(Continued)

FOREIGN PATENT DOCUMENTS

JP 2014-512526 5/2014
JP 2014-215200 11/2014
(Continued)

OTHER PUBLICATIONS

The Extended European Search Report dated Jun. 8, 2017 for European Patent Application No. 17150142.2.
(Continued)

*Primary Examiner* — Eman A Alkafawi
(74) *Attorney, Agent, or Firm* — Greenblum & Bernstein, P.L.C.

(57) ABSTRACT

A positioning sensor includes a transmission antenna transmitting a transmission signal, a plurality of reception antennae, each receiving a reception signals, a receiver observing the each of the plurality of reception signals in a predetermined period, a processor, and a memory, in which the processor calculates a plurality of complex transfer functions based on the each of the plurality of reception signals, records each of the plurality of complex transfer functions in the memory as being associated with each time point, extracts, among the plurality of complex transfer functions, a plurality of pairs of two complex transfer functions respectively corresponding to two time points in a predetermined interval, calculates a plurality of pieces of differential information, and estimates to a location of a moving body based on each of the plurality of pieces of differential information.

7 Claims, 12 Drawing Sheets

(51) Int. Cl.
*G01S 13/00* (2006.01)
*G01S 13/42* (2006.01)
*G01S 13/88* (2006.01)

(58) Field of Classification Search
USPC .......................................................... 702/150
See application file for complete search history.

(56) References Cited

U.S. PATENT DOCUMENTS

| | | | |
|---|---|---|---|
| 2014/0058255 A1 | 2/2014 | Mase et al. | |
| 2014/0200836 A1* | 7/2014 | Lee ........................... | G01F 1/34 702/47 |
| 2015/0018632 A1* | 1/2015 | Khair ..................... | A61B 5/026 600/301 |
| 2016/0025847 A1 | 1/2016 | Okuya et al. | |
| 2016/0030006 A1 | 2/2016 | Okuya et al. | |
| 2016/0157828 A1* | 6/2016 | Sumi .................. | G01N 29/0654 702/189 |

FOREIGN PATENT DOCUMENTS

| | | |
|---|---|---|
| JP | 2015-072173 | 4/2015 |
| JP | 2015-117961 | 6/2015 |
| JP | 2015-117972 | 6/2015 |
| JP | 2015-119770 | 7/2015 |
| WO | 2012/115220 | 8/2012 |
| WO | 2014/141519 | 9/2014 |

OTHER PUBLICATIONS

Fadel Adib et al., "3D tracking via body radio reflections", 11th USENIX Symposium on Networked Systems Design & Implementation (USENIX NSDI'14), pp. 317-329, Apr. 2014.

Dai Sasakawa et al., "Fast Estimation Algorithm for Living Body Radar", 2014 International Symposium on Antennas and Propagation (ISAP 2014), FR3D, pp. 583-584, Dec. 2014.

* cited by examiner

POSITIONING SENSOR AND DIRECTION ESTIMATION METHOD

BACKGROUND

1. Technical Field

The present disclosure relates to a positioning sensor and an estimation method for estimating a direction and a location of a moving body by using a wireless signal.

2. Description of the Related Art

A method using a wireless signal has been examined as a method for recognizing a location and the like of a person (for example, see Japanese Unexamined Patent Application Publication (Translation of PCT Application) No. 2014-512526, International Publication No. 2014/141519, and Japanese Unexamined Patent Application Publication No. 2015-117972). Japanese Unexamined Patent Application Publication (Translation of PCT Application) No. 2014-512526 discloses a method for detecting a living body by using a Doppler sensor and International Publication No. 2014/141519 discloses a method for detecting a motion of a person and living body information by using a Doppler sensor and a filter. Japanese Unexamined Patent Application Publication No. 2015-117972 discloses that a location and a state of a person who is a detecting object can be recognized by analyzing a component containing a Doppler shift with the Fourier transformation.

SUMMARY

However, there is such problem that presence/absence of a person can be detected by the methods of the related art but a direction and a location on which a person exists cannot be detected.

Further, there is another problem that it is difficult to detect a direction in which a living body such as a person exists and a location on which a living body exists with high accuracy in a short period of time. This is because frequency change derived from biological activity based on the Doppler effect is extremely small and observation needs to be performed in a long period of time (for example, several tens of seconds) in a stationary state of a living body so as to observe the frequency change by the Fourier transformation. Further, this is because a living body generally does not keep the same posture or location for several tens of seconds.

In one general aspect, the techniques disclosed here feature a positioning sensor that includes a transmission antenna that transmits a transmission signal to a predetermined area in search of a moving body; a plurality of reception antennae, each of which receives a reception signal, one or more of a plurality of the reception signals received includes a reflection signal generated by the moving body reflecting the transmission signal; a receiver that observes each of the plurality of reception signals in a predetermined sampling cycle in a predetermined period; a processor; and a memory, wherein the processor calculates a plurality of complex transfer functions, each of the plurality of complex transfer functions representing a propagation characteristics between the transmission antenna and each of the plurality of reception antennae based on each of the plurality of reception signals, records each of the plurality of complex transfer functions in the memory as being associated with each time point at which each of the plurality of reception signals is observed, each of the plurality of reception signals corresponding to each of the plurality of complex transfer functions, extracts, among the plurality of complex transfer functions, a plurality of pairs of two complex transfer functions respectively corresponding to two time points in a predetermined interval, calculates a plurality of pieces of differential information representing a difference between a pair of two complex transfer functions included in each of the plurality of pairs of two complex transfer functions, each of the plurality of pieces of differential information being expressed by a vector of N dimensions, and estimates a direction to a location of the moving body with respect to the positioning sensor based on each of the plurality of pieces of differential information.

These general and specific aspects may be implemented using a system, a method, and a computer program, and any combination of systems, methods, and computer programs.

According to the present disclosure, a direction and the like in which a moving body exists can be highly accurately estimated in a short period of time by using a wireless signal.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
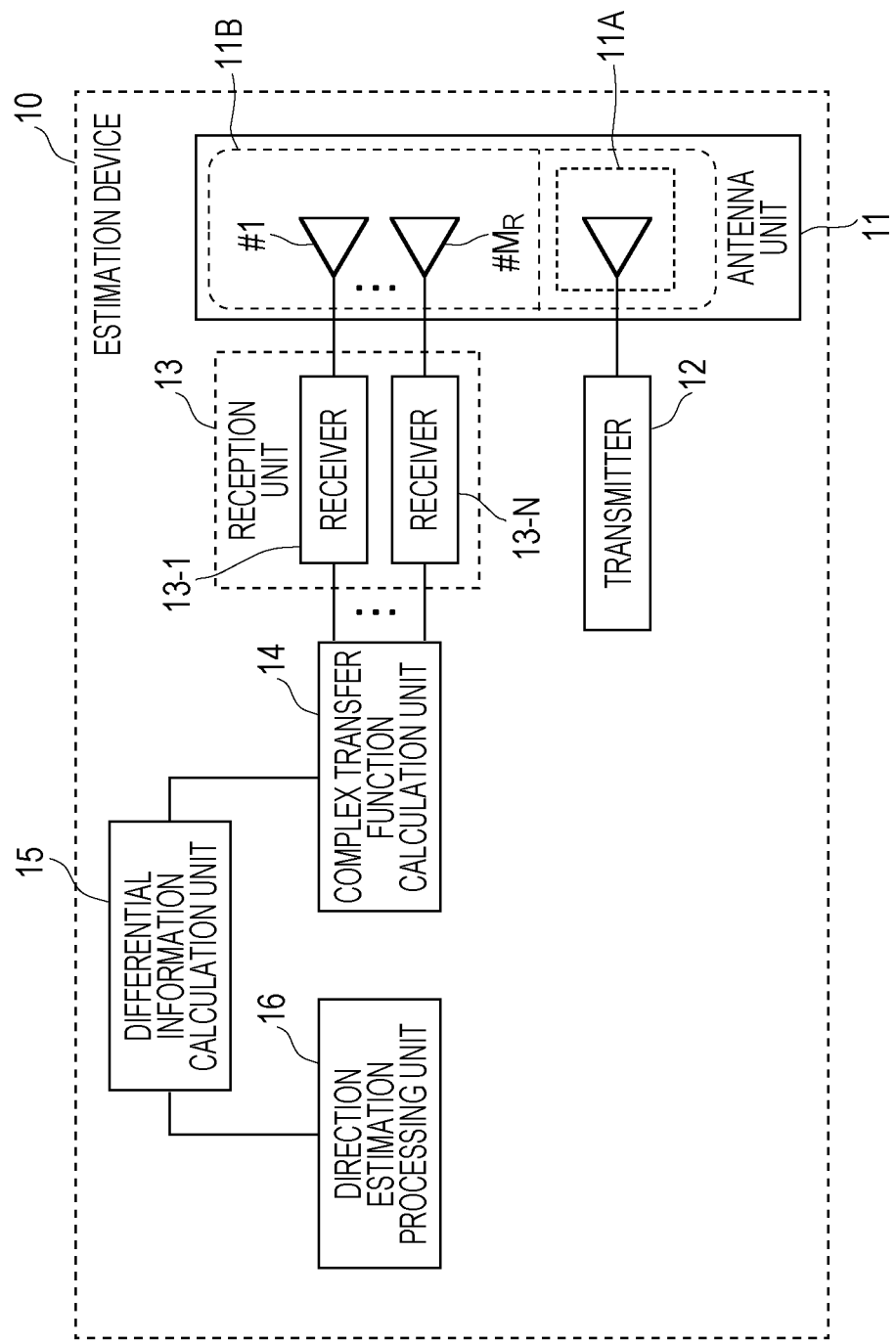
FIG. 1 is a block diagram illustrating an example of the configuration of an estimation device according to a first embodiment.

DETAILED DESCRIPTION (Underlying Knowledge Forming Basis of the Present Disclosure)

A method using a wireless signal has been examined as a method for recognizing a location and the like of a person.

For example, Japanese Unexamined Patent Application Publication (Translation of PCT Application) No. 2014-512526 discloses a method for detecting a living body by using a Doppler sensor and International Publication No.

2014/141519 discloses a method for detecting a motion of a person and living body information by using a Doppler sensor and a filter.

Further, for example, Japanese Unexamined Patent Application Publication No. 2015-117972 discloses that a wireless signal is transmitted to a predetermined region and the wireless signal reflected at a detection object is received by a plurality of antennas so as to estimate a complex transfer function between transmission/reception antennas. The complex transfer function is a function of complex numbers representing a relation between an input and an output, and represents a propagation characteristics between the transmission/reception antennas in this example. The number of elements of this complex transfer function is equal to a product obtained by multiplying the number of transmission antennas by the number of reception antennas.

Japanese Unexamined Patent Application Publication No. 2015-117972 further discloses that a location and a state of a person who is a detecting object can be recognized by analyzing a component containing a Doppler shift with the Fourier transformation. More specifically, temporal change of a component of a complex transfer function is recorded so as to perform the Fourier transformation with respect to a temporal waveform of the temporal change. Living activity such as breathing and heartbeat of a living body such as a person slightly provides the Doppler effect to a reflection wave. Accordingly, a component containing a Doppler shift includes an influence of a person. On the other hand, a component having no Doppler shift is not affected by a person, that is, corresponds to a reflection wave from a fixed object or a direct wave between transmission/reception antennas. Thus, Japanese Unexamined Patent Application Publication No. 2015-117972 discloses that a location and a state of a person who is a detecting object can be recognized by analyzing a component containing a Doppler shift.

In a similar manner, the Fourier transformation is performed with respect to an observed signal so as to take out a Doppler component derived from a person (living body) in Japanese Unexamined Patent Application Publication No. 2015-072173, Japanese Unexamined Patent Application Publication No. 2015-119770, Japanese Patent Application No. 2013-558810, Japanese Unexamined Patent Application Publication No. 2014-215200, Japanese Unexamined Patent Application Publication No. 2015-117961, and International Publication No. 2012/115220, for example. Further, it is disclosed that the Doppler component which is taken out is analyzed so as to detect a location of the living body and states of heartbeat, breathing, and the like of the living body.

Further, F. Adib, Z. Kabelac, D. Katabi, and R. Miller, "3D tracking via body radio reflections", 11th USENIX Symp. Net. Systems Design & Impl. (USENIX NSDI '14), April 2014, for example, discloses a method for detecting a direction and a location of a human body without using the Fourier transformation. In this document, propagation response in an unmanned state is preliminarily measured and a differential component is analyzed on the assumption that difference between the unmanned state and a manned state is caused by a person, so as to estimate a location of the person. More specifically, in a location estimation method disclosed in this document, frequency response in a wide band of 1 GHz or larger is observed and propagation time of an extracted reflection wave derived from a person is calculated so as to estimate distances from a plurality of antennas located on different positions and estimate a location of the person by using the estimated distances. In this document, temporal response of a complex propagation channel in a manned state is observed and subtraction between complex propagation channels of different time is performed so as to extract only a reflection wave which is derived from a person and from which a reflection component from fixed objects such as a wall and a store fixture is eliminated.

Further, for example, Dai Sasakawa, Keita Konno, Naoki Honma, Kentaro Nishimori, Nobuyasu Takemura, Tsutomu Mitsui, "Fast Estimation Algorithm for Living Body Radar", 2014 International Symposium on Antennas and Propagation (ISAP 2014), FR3D, pp. 583-584, December 2014 and Japanese Patent Application No. 2013-558810 disclose a method for estimating a direction of a living body by eliminating unnecessary components from a complex transfer function obtained in a manned state. More specifically, a complex transfer function in an unmanned state is preliminarily measured so as to eliminate a reflection wave from a fixed object and a direct wave between transmission/reception antennas from the complex transfer function. Then, since a complex transfer function in a manned state includes a reflection wave from a fixed object and a direct wave between transmission/reception antennas, the complex transfer function in the unmanned state is subtracted from the complex transfer function in the manned state so as to eliminate unnecessary components.

However, by the above-mentioned method of Japanese Unexamined Patent Application Publication (Translation of PCT Application) No. 2014-512526 and International Publication No. 2014/141519, presence/absence of a person can be detected, but a direction and a location on which a person exists cannot be detected.

Further, in the above-mentioned method of Japanese Unexamined Patent Application Publication No. 2015-117972, observation time of several tens of seconds is required so as to perform the Fourier transformation. Therefore, it is difficult to highly accurately detect a direction and a location of a person in a short period of time. This is because frequency change derived from biological activity based on the Doppler effect is extremely small and observation needs to be performed in a long period of time (for example, several tens of seconds) in a stationary state of a living body so as to observe the frequency change by the Fourier transformation. A living body generally does not keep the same posture or location for several tens of seconds. Therefore, if observation time is shortened, a signal derived from a living body cannot be properly extracted by the Fourier transformation, degrading accuracy in estimation of a direction and a location of a person.

This problem, that is, the above-mentioned problem of Japanese Unexamined Patent Application Publication No. 2015-117972 can occur in a similar manner also in the disclosures of Japanese Unexamined Patent Application Publication No. 2015-072173, Japanese Unexamined Patent Application Publication No. 2015-119770, Japanese Patent Application No. 2013-558810, Japanese Unexamined Patent Application Publication No. 2014-215200, Japanese Unexamined Patent Application Publication No. 2015-117961, and International Publication No. 2012/115220.

Further, there is a problem in which a complex transfer function at an unmanned state needs to be preliminarily measured in the method of Japanese Patent Application No. 2013-558810, "3D tracking via body radio reflections", and "Fast Estimation Algorithm for Living Body Radar". This is because a location of a person cannot be estimated in a case of an occurrence of change of a propagation environment itself such as transfer of store fixtures such as furniture. Since it is conceivable that chairs, tables, and the like are frequently moved given the application to an environment in which a person lives, it is difficult to apply the above-mentioned method of Japanese Patent Application No. 2013-558810, "3D tracking via body radio reflections", and "Fast Estimation Algorithm for Living Body Radar" to a living environment of a person.

Thus, there is a problem in which a direction and the like in which a moving body exists cannot be highly accurately estimated in a short period of time by using a wireless signal, in the related art.

Further, in recent years, a radar has been studied which estimates an existing direction and the like of a living body in a radio wave propagation environment in which a multiple wave exists, by using a feature in which a living body creates Doppler shift on a radio wave by certain living activity such as breathing and heartbeat. That is, a radar has been studied which irradiates a living body with a radio wave, thereby eliminates signal components which do not go through the living body by the Fourier transformation of a reception signal, and estimates an incoming direction of a radio wave reflected from the living body so as to estimate a direction of the living body.

However, a direction of a living body cannot be highly accurately estimated in a short period of time by using the Fourier transformation, as described above.

The inventors have conceived an estimation device and the like by which a direction and the like in which a moving body exists can be highly accurately estimated in a short period of time by using a wireless signal.

(1) A positioning sensor according to an aspect of the present disclosure includes a transmission antenna that transmits a transmission signal to a predetermined area in search of a moving body; a plurality of reception antennae, each of which receives a reception signal, one or more of a plurality of the reception signals received includes a reflection signal generated by the moving body reflecting the transmission signal; a receiver that observes each of the plurality of reception signals in a predetermined sampling cycle in a predetermined period; a processor; and a memory, wherein the processor calculates a plurality of complex transfer functions, each of the plurality of complex transfer functions representing a propagation characteristics between the transmission antenna and each of the plurality of reception antennae based on each of the plurality of reception signals, records each of the plurality of complex transfer functions in the memory as being associated with each time point at which each of the plurality of reception signals is observed, each of the plurality of reception signals corresponding to each of the plurality of complex transfer functions, extracts, among the plurality of complex transfer functions, a plurality of pairs of two complex transfer functions respectively corresponding to two time points in a predetermined interval, calculates a plurality of pieces of differential information representing a difference between a pair of two complex transfer functions included in each of the plurality of pairs of two complex transfer functions, each of the plurality of pieces of differential information being expressed by a vector of N dimensions, and estimates a direction to a location of the moving body with respect to the positioning sensor based on each of the plurality of pieces of differential information.

With this configuration, a direction in which a moving body exists can be estimated with high accuracy in a short period of observation time corresponding to a cycle derived from activity of the moving body. Accordingly, a direction in which a moving body exists can be highly accurately estimated in a short period of time by using a wireless signal.

(2) In the aspect, among a plurality of pairs of two time points, each pair of two time points in a predetermined interval may include a first time and a second time, the first time being a point in time that may be earlier than the second time, and the first time may vary for each of the plurality of pairs of two complex transfer functions.

Accordingly, an influence of instantaneous noise can be reduced by taking an average of two or more pieces of differential information, so that accuracy in direction estimation can be further improved.

(3) In the aspect, the moving body may be a living body.

(4) In the aspect, the predetermined period may be approximately a half cycle of at least one of a breathing cycle, a heartbeat, and a body movement of the living body.

Accordingly, a direction in which a living body exists can be estimated through observation in a period corresponding to a cycle of at least one of breathing, heartbeat, and body movement.

(5) In the aspect, among a plurality of pairs of two time points, each pair of two time points in a predetermined interval may include a first time and a second time, the first time being a point in time that is earlier time than the second time, and the processor for each of the plurality of pairs of two time points, may calculate a correlation matrix with respect to a differential time between the second time and the first time based on each of the plurality of pieces of differential information, may apply a predetermined method to each of the correlation matrices to estimate an incoming direction of the reflection signal with respect to the positioning sensor, and may estimate a direction to a location of the moving body with respect to the positioning sensor based on the incoming direction.

(6) In the aspect, the predetermined method may be a multiple signal classification (MUSIC) algorithm.

(7) A positioning sensor according to another aspect of the present disclosure includes M transmission antennae, M being a natural number of 2 or larger, each transmission antenna transmits a transmission signal to a predetermined area in search of a moving body; N reception antennae, N being a natural number of 2 or larger, each reception antenna receives a reception signal, one or more of the reception signals received includes a reflection signal generated by the moving body reflecting the transmission signal; a receiver that observes each of the reception signals received in a predetermined sampling cycle in a predetermined period; a processor; and a memory, wherein the processor calculates M×N pieces of complex transfer functions, each of the M×N pieces of complex transfer functions representing a propagation characteristics between each of the M transmission antennae and each of the N reception antennae based on each of the reception signals received, records each of the M×N pieces of complex transfer functions in the memory as being associated with each time point at which each of M×N pieces of reception signals is observed, each of the M×N pieces of reception signals corresponding to each of the M×N pieces of complex transfer functions, extracts, among the M×N pieces of complex transfer functions, a plurality of pairs of two complex transfer functions corresponding to two time points in a predetermined interval, calculates a plurality of pieces of differential information representing a difference between a pair of two complex transfer functions included in each of the plurality of pairs of the M×N pieces of complex transfer functions, each of the plurality of pieces of differential information being expressed by a matrix of M×N dimensions, and estimates a direction to a location of the moving body with respect to the positioning sensor based on each of the plurality of pieces of differential information.

With this configuration, a location on which a moving body exists can be estimated with high accuracy in a short period of observation time corresponding to a cycle derived from activity of the moving body. Accordingly, a location on which a moving body exists can be highly accurately estimated in a short period of time by using a wireless signal.

(8) In the aspect, among a plurality of pairs of two time points, each pair of two time points in a predetermined interval may include a first time and a second time, the first time being a point in time that may be earlier than the second time, and the first time may vary for each of the plurality of pairs of two complex transfer functions.

Accordingly, an influence of instantaneous noise can be reduced by taking an average of two or more pieces of differential information, so that accuracy in location estimation can be further improved.

(9) In the aspect, the moving body may be a living body.

(10) In the aspect, the predetermined period may be approximately a half cycle of at least one of a breathing cycle, a heartbeat, and a body movement of the living body.

Accordingly, an average of two or more pieces of differential information can be taken, so that accuracy in location estimation can be further improved by reducing an influence of instantaneous noise.

It should be noted that the present disclosure can be realized not only as a device but also as an integrated circuit including a processing unit provided to such device, as a method including steps using a processing unit constituting the device, as a program causing a computer to execute the steps, and as information, data, or a signal representing the program. The program, the information, the data, and the signal may be distributed via a recording medium such as a CD-ROM and a communication medium such as the Internet.

Embodiments of the present disclosure will be detailed below with reference to the accompanying drawings. Here, each of the embodiments described below represents a preferable specific example of the present disclosure. It should be noted that numerals, shapes, materials, components, arrangement positions and connection configurations of the components, steps, an order of the steps, and the like described in the following embodiments are examples and these do not limit the present disclosure. Further, it should be noted that components which are not described in an independent claim representing the highest concept of the present disclosure are described as arbitrary components constituting more preferable embodiments, among components in the following embodiments. In the present specification and drawings, components substantively having identical functional configurations will be denoted with identical reference characters and duplicate description thereof will be omitted.

First Embodiment

A description will be provided below in which an estimation device 10 according to the first embodiment estimates a direction of a moving body (living body) which is a detection object by using differential information of complex transfer functions obtained by observation at two different time points in a predetermined period, with reference to the accompanying drawings.

[Configuration of Estimation Device 10]

Figure 2:
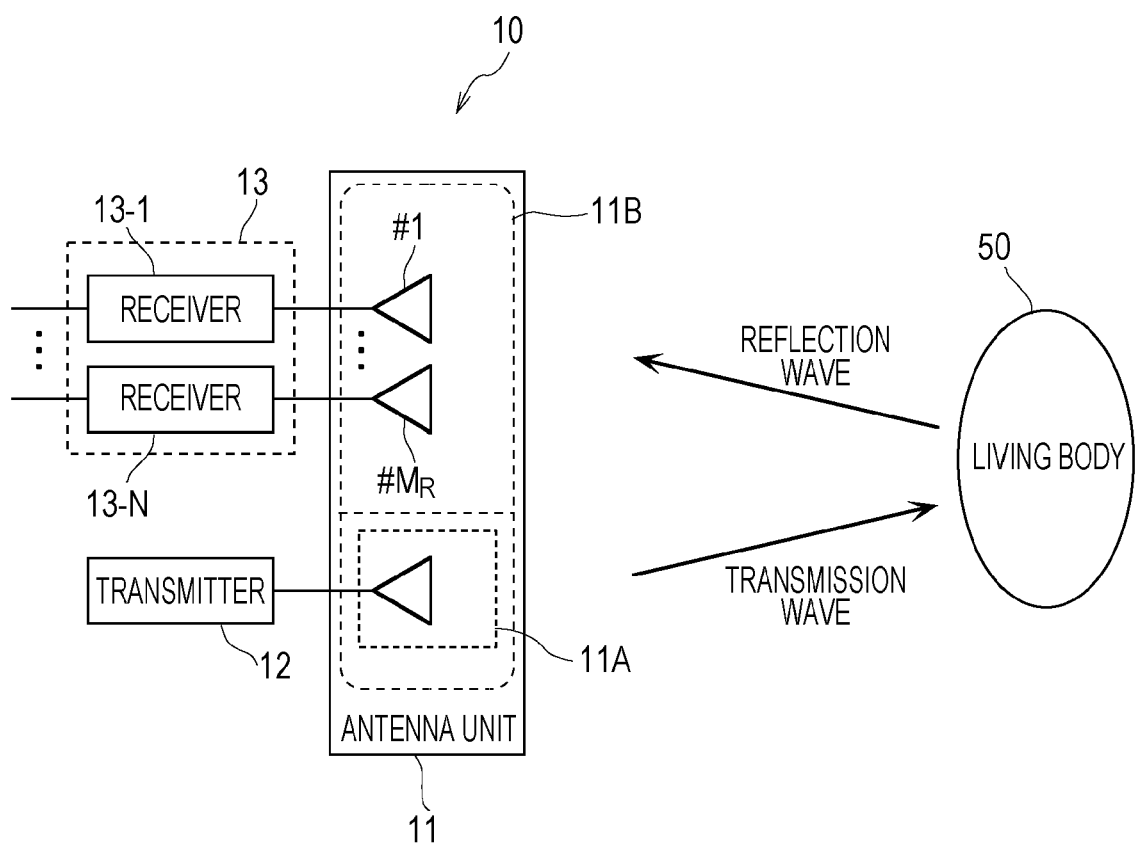
FIG. 2 illustrates an example of a detection object of the estimation device illustrated in FIG. 1.

FIG. 1 is a block diagram illustrating an example of the configuration of the estimation device 10 according to the first embodiment. FIG. 2 illustrates an example of a detection object of the estimation device 10 illustrated in FIG. 1.

The estimation device 10 illustrated in FIG. 1 includes an antenna unit 11, a transmitter 12, a reception unit 13, a complex transfer function calculation unit 14, a differential information calculation unit 15, and a direction estimation processing unit 16, and estimates a direction in which a moving body exists.

[Transmitter 12]

The transmitter 12 generates a high frequency signal used for estimation of a direction of a living body 50. As illustrated in FIG. 2, the transmitter 12 transmits a generated signal (transmission wave) from one piece of transmission antenna element included in the antenna unit 11, for example.

[Antenna Unit 11]

The antenna unit 11 is composed of one piece of transmission antenna element and N pieces (N is a natural number which is 2 or larger) of reception antenna elements. In the present embodiment, the antenna unit 11 is composed of a transmission antenna unit 11A and a reception antenna unit 11B and the transmission antenna unit 11A includes a transmission antenna element which is a transmission antenna of one element and $M_R$ pieces of reception antenna elements (reception array antenna).

As mentioned above, one piece of transmission antenna element transmits a signal (transmission wave) generated by the transmitter 12. Then, each of $M_R$ pieces of reception antenna elements receives a signal (reception signal) which is transmitted from the one piece of transmission antenna element and reflected by the living body 50, as illustrated in FIG. 2, for example.

[Reception Unit 13]

The reception unit 13 observes reception signals which are respectively received by N pieces of reception antenna elements and contain a reflection signal, which is transmitted from the transmission antenna element and reflected by a moving body, in the first period corresponding to a cycle derived from activity of the moving body. Here, the moving body is the living body 50 illustrated in FIG. 2. Further, the cycle derived from activity of the moving body is a cycle which is derived from a living body, that is, a cycle of at least one of breathing, heartbeat, and body movement of the living body 50 (biological variation cycle).

In the present embodiment, the reception unit 13 is composed of N pieces ($M_R$ pieces) of receivers (receivers 13-1 to 13-N). Each of the receivers 13-1 to 13-N converts a high frequency signal received by a corresponding reception antenna element into a low frequency signal which can be subjected to signal processing. The reception unit 13 transfers the low frequency signal obtained through the conversion by each of the receivers 13-1 to 13-N to the complex transfer function calculation unit 14, in at least the first period.

[Complex Transfer Function Calculation Unit 14]

The complex transfer function calculation unit 14 calculates a plurality of complex transfer functions each representing a propagation characteristics between the transmission antenna element and each of N pieces of reception antenna elements based on a plurality of reception signals observed in the first period.

In the present embodiment, the complex transfer function calculation unit 14 calculates complex transfer functions each representing a propagation characteristics between one piece of transmission antenna element and each of $M_R$ pieces of reception antenna elements based on low frequency signals transferred from the reception unit 13. More specific description will be provided below with reference to FIG. 3.

Figure 3:
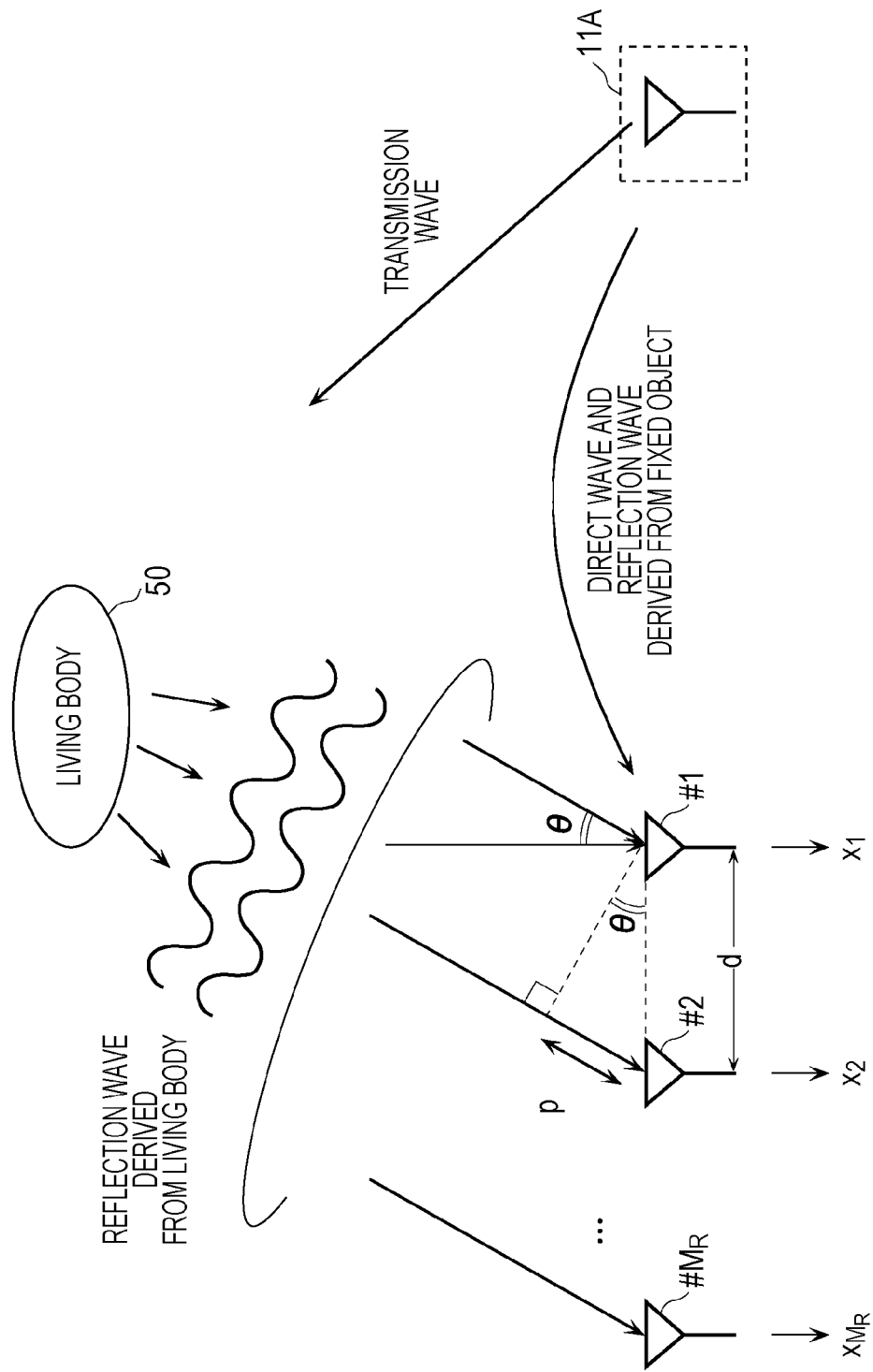
FIG. 3 conceptually illustrates a state of transfer of signal waves in an antenna unit illustrated in FIG. 1.

FIG. 3 conceptually illustrates a state of transfer of signal waves in the antenna unit 11 illustrated in FIG. 1. As illustrated in FIG. 3, a transmission wave transmitted from the transmission antenna element of the transmission antenna unit 11A is reflected by the living body 50 to reach the reception array antenna of the reception antenna unit 11B. Here, the reception array antenna is composed of $M_R$ pieces of reception antenna elements and has a linear array with an element interval d. Further, a direction of the living body 50 viewed from the front of the reception array antenna is denoted as θ. It is assumed that a distance between the living body 50 and the reception array antenna is sufficiently large and a reflection wave which is derived from the living body and arrives at the reception array antenna can be considered as a plane wave.

In this case, the complex transfer function calculation unit 14 is capable of calculating complex transfer function vectors each representing a propagation characteristics between the transmission antenna element and the reception array antenna, from complex reception signal vectors $x=[x_1, \ldots, x_{M_R}]$ observed by using the reception array antenna. The complex transfer function vector can be calculated by $h_0=x/s$, for example. Here, s denotes a complex transmission signal and is assumed to be known.

[Differential Information Calculation Unit 15]

The differential information calculation unit 15 sequentially records a plurality of calculated complex transfer functions in time series corresponding to an order in which a plurality of reception signals are observed. Then, the differential information calculation unit 15 calculates two or more pieces of differential information each of which represents difference between two complex transfer functions corresponding to two time points in a predetermined interval and is expressed by vectors of the N dimensions, among the plurality of complex transfer functions. Here, a start point between two time points in a predetermined interval is time varying between/among two or more pieces of differential information. Further, the predetermined interval may be approximately a half of a cycle derived from the living body 50 (biological variation cycle).

Figure 4:
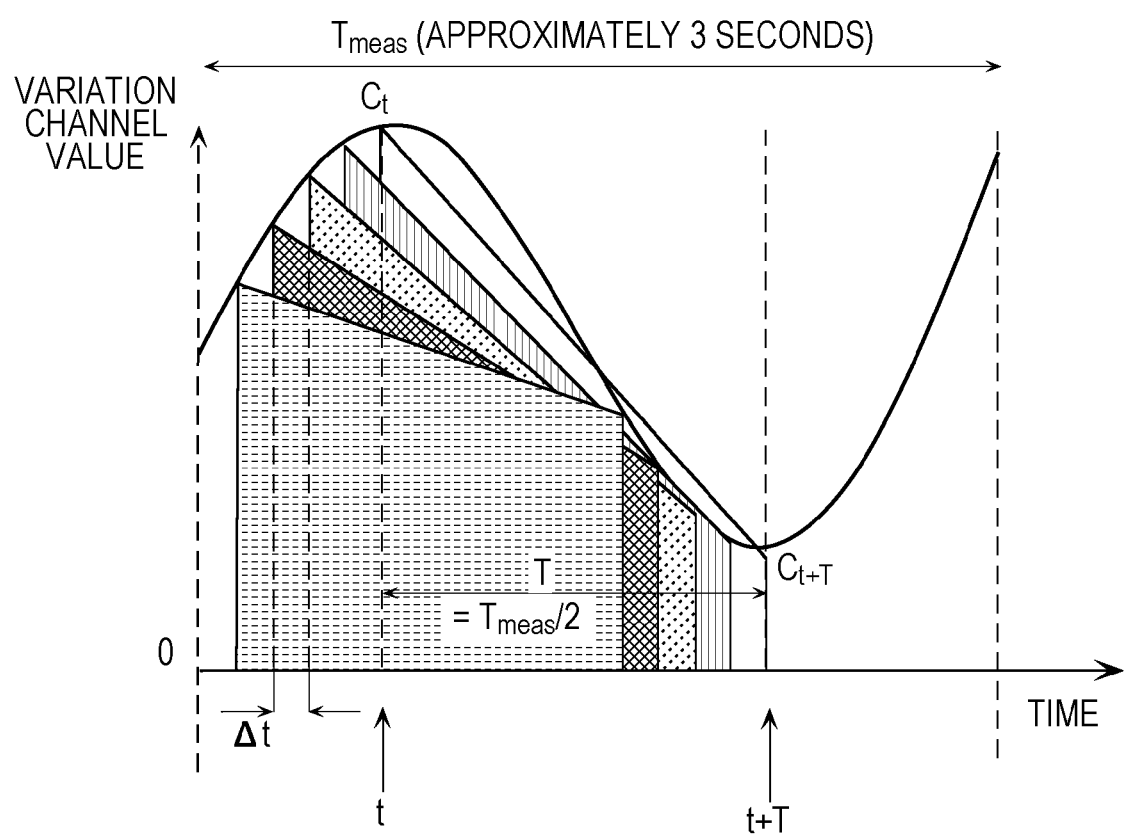
FIG. 4 is a conceptual diagram illustrating an example of two time points in a predetermined interval used in calculation of differential information in the first embodiment.
Figure 5:
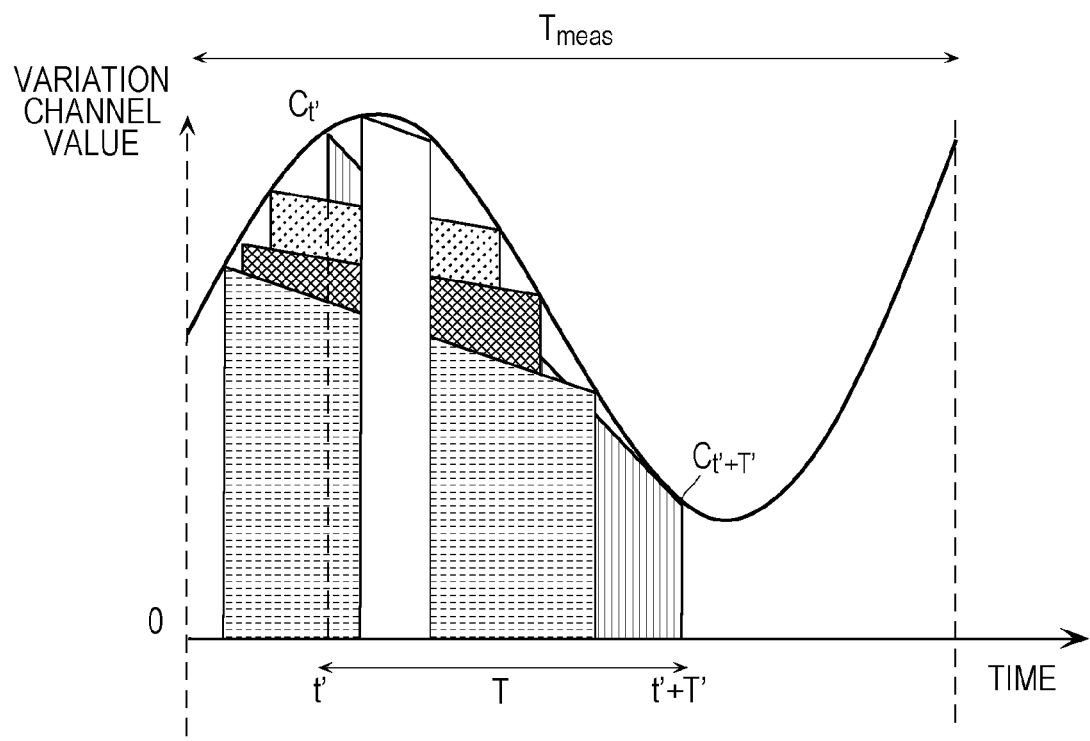
FIG. 5 is a conceptual diagram illustrating an example of two time points in a predetermined interval different from that in FIG. 4.

FIG. 4 is a conceptual diagram illustrating an example of two time points in a predetermined interval used in calculation of differential information in the first embodiment. FIG. 5 is a conceptual diagram illustrating an example of two time points in a predetermined interval different from that in FIG. 4. In FIG. 4, the vertical axis represents a variation channel value and the horizontal axis represents time. Further, $T_{meas}$ denotes observation time of reception signals. This observation time $T_{meas}$ is the above-mentioned first period. The observation time $T_{meas}$ corresponds to the biological variation maximum cycle of at least one of breathing, heartbeat, and body movement of a living body, for example, that is, the maximum cycle derived from biological variation. In the example illustrated in FIG. 4, observation time is set to approximately three seconds corresponding to a cycle of breathing activity of the living body 50.

In a case where a plurality of complex transfer functions calculated from reception signals observed by the reception unit 13 in the observation time $T_{meas}$ illustrated in FIG. 4, that is, temporal variation channels are recorded in sequence, the observation time $T_{meas}$ corresponds to the biological variation maximum cycle, so that the maximum value and the minimum value of variation of the living body 50 are always included in the observation time $T_{meas}$. Here, when the biological variation maximum cycle is denoted as $T_{max}$ and the minimum cycle derived from biological variation (biological variation minimum cycle) is denoted as $T_{min}$, time subtraction of $T_{max}/2$ and $T_{min}/2$, which are half cycles of $T_{max}$ and $T_{min}$, is time difference corresponding to variation of the living body 50. Therefore, a predetermined interval T in calculation of differential information of complex transfer functions can be set in a range of $T_{max}/2 \leq T \leq T_{min}/2$. Thus, even when the predetermined interval T is set to be approximately a half of a cycle derived from the living body 50 (biological variation cycle), components derived from the living body can be extracted from temporal variation channels for one cycle of the living body 50.

Further, in the example illustrated in FIG. 4, the differential information calculation unit 15 calculates differential information representing difference between complex transfer functions corresponding to different time: time t and time t+T, for example, that is, two time points in the predetermined interval T. Then, the differential information calculation unit 15 performs the calculation of differential information a plurality of times in respective predetermined intervals T whose start points are shifted by Δt one by one. That is, the differential information calculation unit 15 performs such calculation of differential information in a predetermined interval T between other two time points (with respect to a different pair of complex transfer functions). Here, differential information is calculated because complex transfer function components going through fixed objects other than the living body 50 are eliminated and only complex transfer function components going only through the living body 50 are left.

In the present embodiment, there are a plurality of reception antenna elements ($M_R$ pieces), so that there are a plurality of differential values (pieces of differential information) of complex transfer functions corresponding to the reception antenna unit 11B. These differential values are collectively defined as a complex differential channel vector. When the number of reception antenna elements is denoted as $M_R$, the complex differential channel vector is expressed as $h(l,m)=[h_1(l,m), \ldots, h_{M_R}(l,m)]^T$ in which $1 \leq l$ and $m \leq N$ hold ($l \neq m$, N denotes the total number of times of measurement). Further, l and m are positive integers denoting measurement numbers and are sample time. $[\cdot]^T$ denotes transposition. In the example illustrated in FIG. 4, N denotes the number of times of channel observation and corresponds to the number of vertices of trapezoids (data used in calculation) including two time points in the time interval T such as $C_t$ and $C_{t+T}$. When the observation time $T_{meas}$ is three seconds and measurement (observation) is performed 100 times, N=300 is obtained.

A complex transfer function vector calculated by the complex transfer function calculation unit 14 contains a direct wave and reflection waves which do not go through the living body 50 such as a reflection wave derived from a fixed object, as illustrated in FIG. 3, for example. On the other hand, in a complex differential channel vector, reflection waves which do not go through the living body 50 are all eliminated by calculation of difference between complex transfer function vectors corresponding to two time points and only reflection waves derived from the living body are contained. This differential calculation has such demerit that complex transfer functions of reflection waves derived from the living body 50 are subtracted as well. However, since amplification and phases of reflection waves going through the living body 50 vary at all times due to biological activity such as breathing and heartbeat, a complex differential channel vector does not become completely 0. That is, when subtraction is performed between complex transfer function vectors corresponding to two different time points, a product obtained by multiplying a complex transfer function vector going through the living body 50 by a coefficient is left.

Here, the differential information calculation unit 15 performs calculation of differential information with respect to a plurality of pairs (complex transfer functions on two different time points) so as to reduce an influence of instantaneous noise and improve accuracy in direction estimation by taking an average of a plurality of times of calculation, as described later. In addition, the predetermined interval T in calculation of differential information does not have to have a fixed value as illustrated in FIG. 4, but may be an arbitrary predetermined interval, that is, a predetermined interval T' between two time points such as time t' and time t'+T', illustrated in FIG. 15, for example.

[Direction Estimation Processing Unit 16]

The direction estimation processing unit 16 estimates a direction in which a moving body exists based on the two or more pieces of calculated differential information by using the estimation device 10 as a reference of a direction. More specifically, the direction estimation processing unit 16 calculates an instantaneous correlation matrix, which is a correlation matrix of differential time between two time points in a predetermined interval in corresponding differential information, from each of the two or more pieces of calculated differential information, so as to estimate an incoming direction of a reflection signal by using the calculated instantaneous correlation matrix based on a predetermined incoming direction estimation method. Then, the direction estimation processing unit 16 estimates a direction in which a moving body exists based on the estimated incoming direction of a reflection signal. Here, the predetermined incoming direction estimation method is an estimation method based on the multiple signal classification (MUSIC) algorithm.

In the present embodiment, the direction estimation processing unit 16 calculates a correlation matrix (referred to below as an "instantaneous correlation matrix") shown as (Formula 1) based on complex differential channel vectors calculated as a plurality of pieces of differential information by the differential information calculation unit 15. The differential time between two time points in a predetermined interval is an instant, so that the correlation matrix shown as (Formula 1) is referred to as the "instantaneous correlation matrix".

$$R_V(l,m) = h(l,m)h^H(l,m) \quad \text{(Formula 1)},$$

where $[\cdot]^H$ denotes complex conjugate transposition.

Further, the direction estimation processing unit 16 may average (average calculation) this instantaneous correlation matrix as expressed as (Formula 2). This is because an influence of instantaneous noise can be reduced to improve accuracy in direction estimation due to this average calculation, as described above.

$$R = \frac{1}{N(N-1)} \sum_{l=1}^{N} \sum_{m=1(m \neq l)}^{N} R_i(l,m) \quad \text{(Formula 2)}$$

Here, the rank of the instantaneous correlation matrix expressed as (Formula 1) is 1. This instantaneous correlation matrix is obtained by converting a vector of 4×1 into a matrix of 4×4 and is merely a matrix including rows obtained by multiplying a single row component by an integer. Therefore, a simultaneous equation cannot be solved, that is, this instantaneous correlation matrix is on the rank 1.

However, the rank of the correlation matrix can be restored by average calculation of the instantaneous correlation matrix. That is, as an eigenvalue (≈rank) can be increased by averaging (Formula 1) as (Formula 2), variables (targets) to be able to be solved can be increased. Accordingly, eigenvalues of (Formula 2) are increased, and thus, estimation accuracy can be improved. Further, though described later, simultaneous estimation of a plurality of incoming waves is enabled. Here, average calculation is often used to improve accuracy in the later-described MUSIC method and is usually performed by using a frequency component. On the other hand, the present embodiment is different in that averaging is performed in a temporal direction.

Thus, complex transfer functions are recorded in a time series manner in a certain period and (all of) the recorded complex transfer functions are used, providing such advantageous effect that estimation accuracy can be improved even in a case where an observation period is relatively short (for example, a few seconds).

The direction estimation processing unit 16 is capable of estimating an incoming direction of a reflection signal by using the instantaneous correlation matrix calculated as described above.

A method for performing direction estimation by using an instantaneous correlation matrix obtained from complex differential channel vectors will be described below. An estimation method based on the MUSIC algorithm will be described here.

When the instantaneous correlation matrix expressed as (Formula 2) is subjected to eigenvalue decomposition, $R = U\Lambda U^H$, $U = [u_1, \ldots, u_L, u_{L+1}, \ldots, u_{M_R}]$, and $\Lambda = \text{diag}[\lambda_1, \ldots, \lambda_L, \lambda_{L+1}, \ldots, \lambda_{M_R}]$ are obtained.

Here, $u_1, \ldots, u_{M_R}$ are eigenvectors whose number of elements is $M_R$ and $\lambda_1, \ldots, \lambda_{M_R}$ are eigenvalues corresponding to eigenvectors and are in an order of $\lambda_1 \geq \lambda_2 \geq \ldots \lambda_L, \lambda_{L+1} \geq \lambda_{M_R}$. L denotes the number of incoming waves, that is, the number of living bodies which are detection objects.

Further, a steering vector (direction vector) of the reception array antenna is defined as $a(\theta) = [1, e^{-jkd \sin \theta}, \ldots, e^{-jkd(M_R-1)\sin \theta}]^T$ and the MUSIC method is applied to $a(\theta) = [1, e^{-jkd \sin \theta}, \ldots, e^{-jkd(M_R-1)\sin \theta}]^T$. Here, k denotes the number of waves.

That is, the direction estimation processing unit 16 searches the local maximal value of an evaluation function $P_{music}(\theta)$ expressed below by using the steering vector of the reception array antenna based on the MUSIC method, being able to estimate the direction of an incoming wave.

$$P_{music}(\theta) = \frac{1}{|a^H(\theta)[u_{L+1}, \ldots, u_{M_R}]|^2}$$

The direction estimation processing unit 16 thus performs eigenvalue decomposition of the instantaneous correlation matrix and applies the MUSIC method so as to be able to estimate an incoming direction of a reflection signal. Accordingly, the direction estimation processing unit 16 can estimate a direction in which the living body 50 exists based on the estimated incoming direction of the reflection signal. This is because the estimated incoming direction of the reflection signal is approximately accorded with the direction in which the living body 50 exists relative to the estimation device 10.

[Operation of Estimation Device 10]

Figure 6:
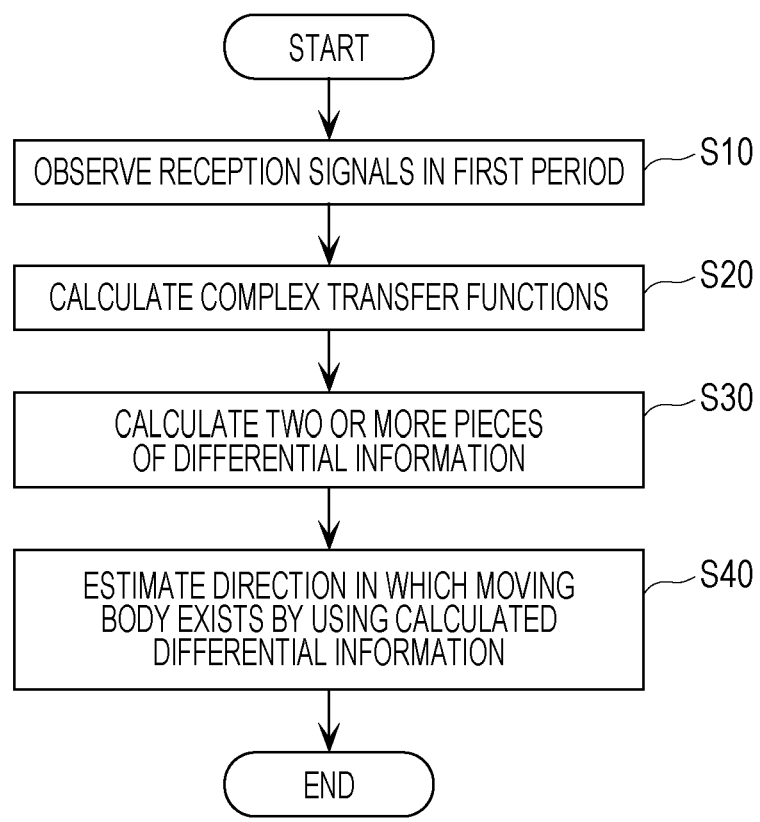
FIG. 6 is a flowchart illustrating estimation processing of the estimation device according to the first embodiment.

An operation in estimation processing of the estimation device 10 configured as described above will be described. FIG. 6 is a flowchart illustrating the estimation processing of the estimation device 10 according to the first embodiment.

The estimation device 10 first observes reception signals containing a reflection signal, which is transmitted from one piece of transmission antenna element and reflected by the living body 50, in the first period corresponding to a cycle derived from activity of the living body 50 (S10).

Then, the estimation device 10 calculates a plurality of complex transfer functions each representing a propagation characteristics between one piece of transmission antenna element and each of $M_R$ pieces of reception antenna elements based on a plurality of reception signals observed in the first period (S20). As the detailed description has been provided above, provision of the description is omitted here. The same goes for the following.

Subsequently, the estimation device 10 calculates two or more pieces of differential information each representing difference between two complex transfer functions corresponding to two time points in a predetermined interval, among a plurality of complex transfer functions (S30).

Then, the estimation device 10 estimates a direction in which the living body 50 exists by using the two or more pieces of differential information (S40).

[Advantageous Effects Etc.]

According to the estimation device 10 and the estimation method of the present embodiment, by calculating the above-described differential information, signal processing by which only components derived from a living body are left in a wireless signal can be performed without using the Fourier transformation in shorter processing time than that in the case using the Fourier transformation. Further, estimation accuracy can be improved by using a plurality of pieces of differential information. Accordingly, a direction in which a moving body exists can be highly accurately estimated in short observation time corresponding to a cycle derived from activity of the moving body. Thus, a direction in which a moving body exists can be highly accurately estimated in a short period of time by using a wireless signal.

Embodiment 2

In the first embodiment, the description of the estimation device 10 and the estimation method thereof is provided in which a direction in which a moving body (living body), which is a detection object, exists is estimated by using differential information of complex transfer functions observed at two different time points in a predetermined period. In the second embodiment, an estimation device 20 and an estimation method thereof will be described in which a location of a moving body (living body), which is a detection object, is estimated by using similar differential information.

[Configuration of Estimation Device 20]

Figure 7:
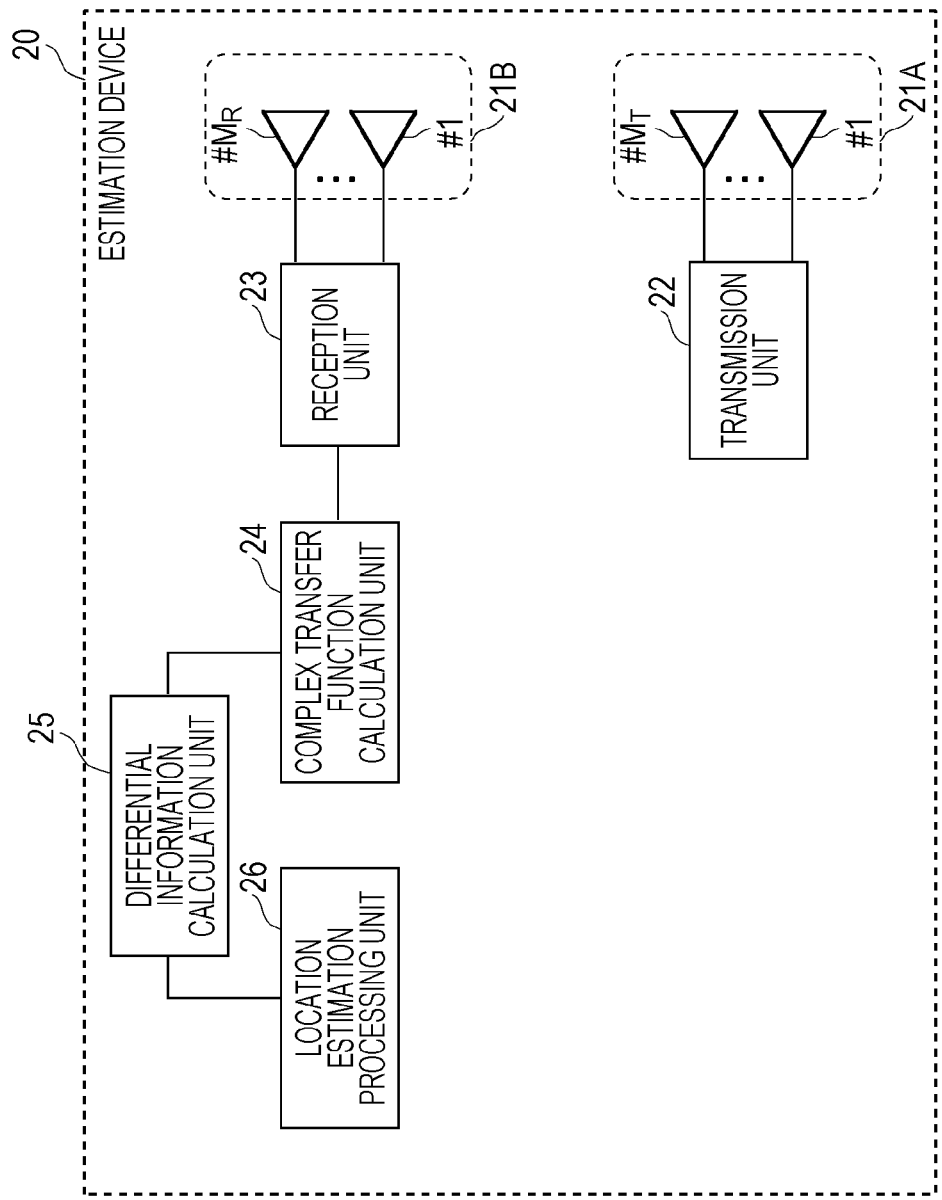
FIG. 7 is a block diagram illustrating an example of the configuration of an estimation device according to a second embodiment.
Figure 8:
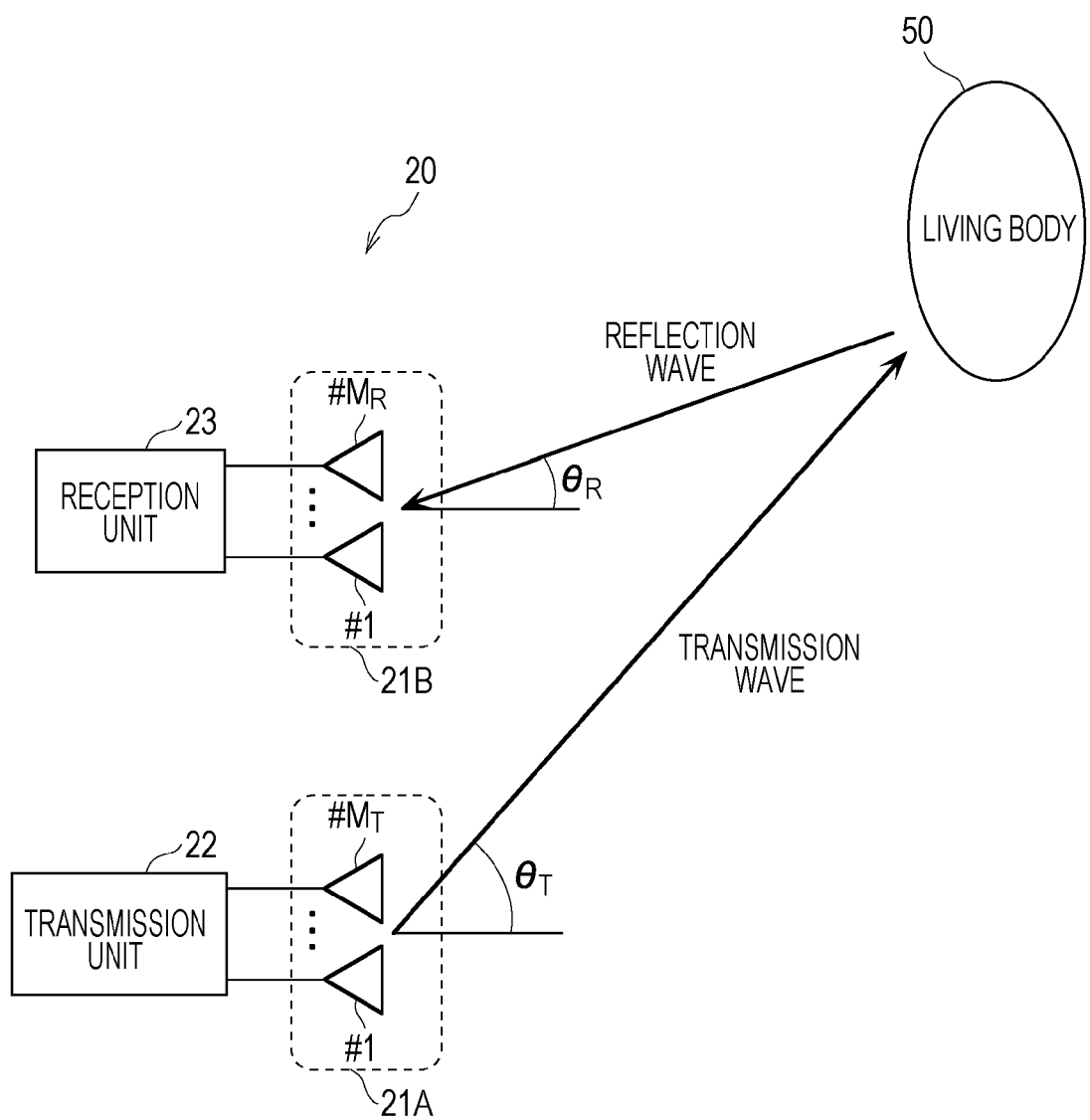
FIG. 8 illustrates an example of a detection object of the estimation device illustrated in FIG. 7.

FIG. 7 is a block diagram illustrating an example of the configuration of the estimation device 20 according to the second embodiment. FIG. 8 illustrates an example of a detection object of the estimation device 20 illustrated in FIG. 7. Components similar to those in FIG. 1 and FIG. 2 are denoted with the same reference characters and detailed description thereof will be omitted.

The estimation device 20 illustrated in FIG. 7 includes a transmission antenna unit 21A, a reception antenna unit 21B, a transmission unit 22, a reception unit 23, a complex transfer function calculation unit 24, a differential information calculation unit 25, and a location estimation processing unit 26, and estimates a location of a moving body. At least the number of transmission antenna elements of the estimation device 20 illustrated in FIG. 7 is different from that in the estimation device 10 illustrated in FIG. 1 and accordingly, the estimation device 20 is capable of estimating a location of a moving body.

[Transmission Unit 22]

The transmission unit 22 generates a high frequency signal used for estimation of a direction of the living body 50. As illustrated in FIG. 8, the transmission unit 22 transmits a generated signal (transmission wave) from $M_T$ pieces of transmission antenna elements (transmission array antenna) included in the transmission antenna unit 21A, for example.

[Transmission Antenna Unit 21A]

The transmission antenna unit 21A is composed of M pieces (M is a natural number which is 2 or larger) of transmission antenna elements. In the present embodiment, the transmission antenna unit 21A includes $M_T$ pieces of transmission antenna elements. As mentioned above, the $M_T$ pieces of transmission antenna elements transmit signals (transmission waves) generated by the transmission unit 22.

[Reception Antenna Unit 21B]

The reception antenna unit 21B is composed of N pieces (N is a natural number which is 2 or larger) of reception antenna elements (reception array antenna). As is the case with the first embodiment, the reception antenna unit 21B includes $M_R$ pieces of reception antenna elements (reception array antenna) in the present embodiment. As illustrated in FIG. 8, for example, each of the $M_R$ pieces of reception antenna elements receives a signal (reception signal) which is transmitted from the $M_T$ pieces of transmission antenna elements (transmission array antenna) and reflected by the living body 50.

[Reception Unit 23]

The reception unit 23 observes reception signals which are respectively received by the N pieces of reception antenna elements and contain reflection signals, which are respectively transmitted from the M pieces of transmission antenna elements and reflected by a moving body, in the first period corresponding to a cycle derived from activity of the moving body. Here, the moving body is the living body 50 illustrated in FIG. 8. Further, the cycle derived from activity of the moving body is a cycle which is derived from a living body, that is, a cycle of at least one of breathing, heartbeat, and body movement of the living body 50 (biological variation cycle).

In the present embodiment, the reception unit 23 is composed of $M_R$ pieces of receivers. Each of the $M_R$ pieces of receivers converts a high frequency signal received by a corresponding reception antenna element into a low frequency signal which can be subjected to signal processing. The reception unit 23 transfers the low frequency signal obtained through the conversion by each of the $M_R$ pieces of receivers to the complex transfer function calculation unit 24, in at least the first period.

[Complex Transfer Function Calculation Unit 24]

The complex transfer function calculation unit 24 calculates a plurality of complex transfer functions each representing a propagation characteristics between each of the M pieces of transmission antenna elements and each of the N pieces of reception antenna elements based on a plurality of reception signals observed in the first period.

In the present embodiment, the complex transfer function calculation unit 24 calculates complex transfer functions representing propagation properties between the $M_T$ pieces of transmission antenna elements and the $M_R$ pieces of reception antenna elements based on low frequency signals transferred from the reception unit 13. More specific description will be provided with reference to FIG. 8.

In FIG. 8, both of the transmission array antenna and the reception array antenna have a linear array with element interval d and directions of the living body 50 viewed from the front of the transmission array antenna and the front of the reception array antenna are respectively denoted as $\theta_T$ and $\theta_R$. It is assumed that a distance between the living body and the transmission/reception array antenna is sufficiently large compared to an opening width of the array antenna and a signal which starts from the transmission array antenna and goes through the living body to reach the reception array antenna can be considered as a plane wave.

As illustrated in FIG. 8, transmission waves transmitted from the $M_T$ pieces of transmission antenna elements (transmission array antenna) of the transmission antenna unit 21A by the angle $\theta_T$ are reflected by the living body 50 to reach the reception array antenna by the angle $\theta_R$.

In this case, the complex transfer function calculation unit 24 is capable of calculating complex transfer function vectors from complex reception signal vectors observed by using the reception array antenna. The complex transfer function vectors are expressed in a matrix form and can be calculated in a similar manner to the first embodiment. Here, the calculated complex transfer function matrix contains a direct wave and reflection waves which do not go through the living body 50 such as a reflection wave derived from a fixed object, as described above.

[Differential Information Calculation Unit 25]

The differential information calculation unit 25 sequentially records a plurality of calculated complex transfer functions in time series corresponding to an order in which a plurality of reception signals are observed. Then, the differential information calculation unit 25 calculates two or more pieces of differential information each of which represents difference between two complex transfer functions corresponding to two time points in a predetermined interval and is expressed by a matrix of the M×N dimensions, among the plurality of complex transfer functions. Here, a start point between two time points in a predetermined interval is time varying between/among two or more pieces of differential information. Further, the predetermined interval may be approximately a half of a cycle derived from the living body 50 (biological variation cycle).

Here, as two time points in a predetermined interval used in calculation of differential information have been described in the first embodiment with reference to FIG. 4, the description thereof is omitted here.

In the present embodiment as well, the differential information calculation unit 25 calculates differential information representing difference between two complex transfer functions corresponding to two different time points in the predetermined interval T among complex transfer functions calculated by the complex transfer function calculation unit 24. Further, the differential information calculation unit 25 executes calculation of differential information with respect to other two different time points (a different pair of complex transfer functions) as well. Here, differential information is calculated so as to eliminate complex transfer function components going through fixed objects other than the living body 50 and leave only complex transfer function components going only through the living body 50, as is the case with the first embodiment.

In the present embodiment, a plurality of transmission antenna elements and a plurality of reception antenna elements are provided. Therefore, the number of differential values (pieces of differential information) of complex transfer functions corresponding to the transmission antenna unit 21A and the reception antenna unit 21B is the number obtained by transmission antenna elements×reception antenna elements ($M_R \times M_T$) and these differential values are collectively defined as a complex differential channel matrix H(l,m). The differential information calculation unit 25 calculates, as the differential information, a complex differential channel matrix H(l,m) expressed as the following. In this complex differential channel matrix H(l,m), reflection waves which do not go through the living body 50 are all eliminated by differential calculation and therefore, only reflection waves derived from the living body 50 are contained.

$$H(l,m) = \begin{bmatrix} h_{11}(l,m) & \cdots & h_{1M_T}(l,m) \\ \vdots & \ddots & \vdots \\ h_{M_R1}(l,m) & \cdots & h_{1M_RM_T}(l,m) \end{bmatrix}$$

Here, $1 \le l$ and $m \le N$ hold ($l \ne m$, N denotes the total number of times of measurement). Further, l and m are positive integers denoting measurement numbers and are sample time.

[Location Estimation Processing Unit 26]

The location estimation processing unit 26 estimates a location on which a moving body exists based on the two or more pieces of calculated differential information. More specifically, the location estimation processing unit 26 calculates an instantaneous correlation matrix, which is a correlation matrix of differential time between two time points in a predetermined interval in corresponding differential information, from each of the two or more pieces of calculated differential information. Then, the location estimation processing unit 26 estimates a transmission direction of a transmission signal which is transmitted from the transmission antenna unit 21A to the moving body and an incoming direction of a reflection signal by using the calculated instantaneous correlation matrix based on a predetermined incoming direction estimation method. Subsequently, the location estimation processing unit 26 estimates the location on which the moving body exists, based on the estimated transmission direction of a transmission signal and the estimated incoming direction of the reflection signal. Here, the predetermined incoming direction estimation method is an estimation method based on the MUSIC algorithm.

In the present embodiment, the location estimation processing unit 26 calculates an instantaneous correlation matrix based on a complex differential channel matrix calculated as a plurality of pieces of differential information by the differential information calculation unit 25.

More specifically, the location estimation processing unit 26 rearranges elements of the above-mentioned complex differential channel matrix H(l,m) calculated by the differential information calculation unit 25 so as to calculate a complex differential channel of a vector of $M_RM_T \times 1$ expressed as (Formula 3).

$$h_v(l, m) = \text{vec}(H(l, m)) \quad \text{(Formula 3)}$$

$$= [h_{11}(l, m), \ldots, h_{M_R1}(l, m), h_{12}(l, m), \ldots,$$

$$h_{M_R2}(l, m), \ldots, h_{M_RM_T}(l, m)]^T$$

Here, vec(•) represents conversion of a matrix into a vector.

Then, the location estimation processing unit 26 calculates an instantaneous correlation matrix expressed as (Formula 4) from this complex differential channel vector.

$$R_i(l,m) = h_V(l,m) h_V^H(l,m) \quad \text{(Formula 4)}$$

Further, the location estimation processing unit 26 may average (average calculation) this instantaneous correlation matrix as expressed as (Formula 5). This is because an influence of instantaneous noise can be reduced to improve accuracy in direction estimation due to this average calculation, as described above.

$$R = \frac{1}{N(N-1)} \sum_{l=1}^{N} \sum_{m=1(m \neq l)}^{N} R_i(l, m) \quad \text{(Formula 5)}$$

Here, the rank of the instantaneous correlation matrix of (Formula 4) is 1, but the rank of the correlation matrix can be restored by average calculation of the instantaneous correlation matrix, as described in the first embodiment as well. This enables not only improvement in estimation accuracy but also simultaneous estimation of a plurality of incoming waves.

Thus, complex transfer functions are recorded in a time series manner in a certain period and (all of) the recorded complex transfer functions are used, providing such advantageous effect that estimation accuracy can be improved even in a case where an observation period is relatively short (for example, a few seconds).

The location estimation processing unit 26 is capable of estimating a location of the living body 50 by using the instantaneous correlation matrix calculated as described above.

A method for performing direction estimation by using an instantaneous correlation matrix obtained from a complex differential channel matrix will now be described. An estimation method based on the MUSIC algorithm will be described in the present embodiment as well.

When the instantaneous correlation matrix expressed as (Formula 5) is subjected to eigenvalue decomposition, $R = U\Lambda U^H$, $U = [u_1, \ldots, u_L, u_{L+1}, \ldots, u_{M_R}]$, and $\Lambda = \text{diag}[\lambda_1, \ldots, \lambda_L, \lambda_{L+1}, \ldots, \lambda_{M_R}]$ are obtained.

Here, $u_1, \ldots, u_{M_R}$ are eigenvectors whose number of elements is $M_R$ and $\lambda_1, \ldots, \lambda_{M_R}$ are eigenvalues corresponding to eigenvectors and are in an order of $\lambda_1 \geq \lambda_2 \geq \ldots \geq \lambda_L$, $\lambda_{L+1} \geq \ldots \geq \lambda_{M_R}$. L denotes the number of incoming waves, that is, the number of living bodies which are detection objects.

Further, a steering vector (direction vector) of the transmission array antenna is defined as $a_T(\theta_T) = [1, e^{-jkd \sin \theta_T}, \ldots, e^{-jkd(M_T-1) \sin \theta_T}]^T$ and a steering vector of the reception array antenna (direction vector) is defined as $a_R(\theta_R) = [1, e^{-jkd \sin \theta_R}, \ldots, e^{-jkd(M_R-1) \sin \theta_R}]^T$. Here, k denotes the number of waves.

Further, these steering vectors are subjected to multiplication so as to define a steering vector considering angle information of both of the transmission array antenna and the reception array antenna as $a(\theta_T, \theta_R) = \text{vec}\{a_r(\theta_r) a_R^T(,\theta_R)\}$ and the MUSIC method is applied to the steering vector.

That is, the location estimation processing unit 26 searches the local maximal value with an evaluation function $P_{music}(\theta)$ expressed below by using the multiplied steering vector based on the MUSIC method, being able to estimate the direction of an incoming wave.

$$P_{music}(\theta) = \frac{1}{|a^H(\theta_T, \theta_R)[u_{L+1}, \ldots, u_{M_R}]|^2}$$

In the present embodiment, since it is necessary to search the local maximal value of an evaluation function for two angles $(\theta_T, \theta_R)$, two-dimensional search processing is executed. Then, the location estimation processing unit 26 estimates a transmission direction of a transmission wave to the living body 50 and an incoming direction of a reflection wave from the living body 50 based on the two angles $(\theta_T, \theta_R)$ thus obtained so as to estimate a location of the living body 50 based on an intersection of the estimated two directions.

[Operation of Estimation Device 20]

Figure 9:
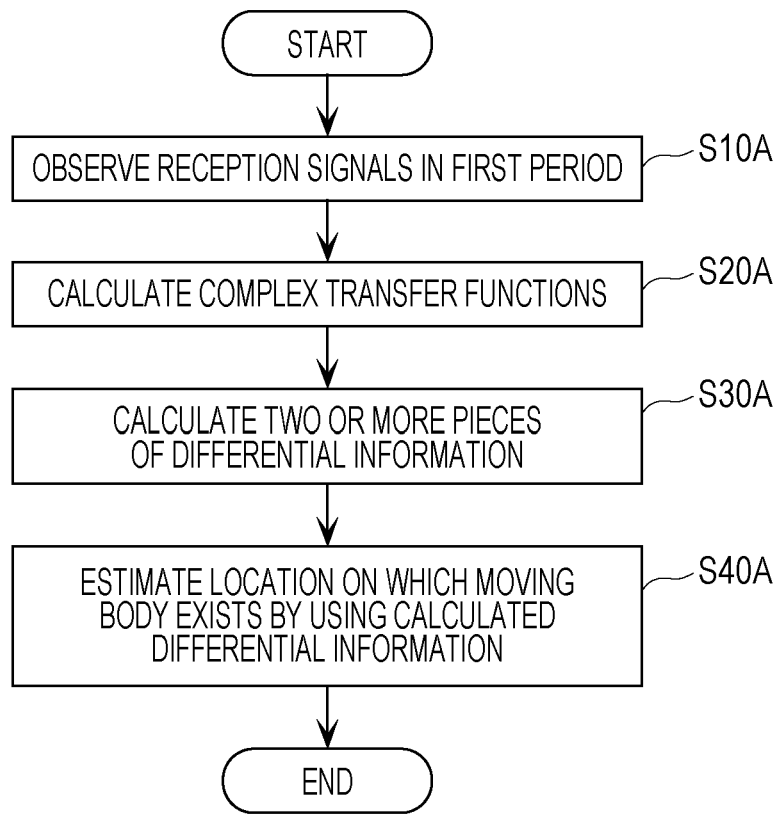
FIG. 9 is a flowchart illustrating estimation processing of the estimation device according to the second embodiment.

An operation in estimation processing of the estimation device 20 configured as described above will be described. FIG. 9 is a flowchart illustrating the estimation processing of the estimation device 20 according to the second embodiment.

The estimation device 20 first observes reception signals containing a reflection signal which is transmitted from $M_T$ pieces of transmission antenna elements and reflected by the living body 50, in the first period corresponding to a cycle derived from activity of the living body 50 (S10A).

Then, the estimation device 20 calculates a plurality of complex transfer functions each representing a propagation characteristics between each of the $M_T$ pieces of transmission antenna elements and each of the $M_R$ pieces of reception antenna elements based on a plurality of reception signals observed in the first period (S20A). As the detailed description has been provided above, provision of the description is omitted here. The same goes for the following.

Subsequently, the estimation device 20 calculates two or more pieces of differential information each representing difference between two complex transfer functions corresponding to two time points in a predetermined interval among a plurality of complex transfer functions (S30A).

Then, the estimation device 20 estimates a location on which the living body 50 exists by using the two or more pieces of differential information (S40A).

[Advantageous Effects Etc.]

According to the estimation device 20 and the estimation method of the present embodiment, by calculating the above-described differential information, signal processing by which only components derived from a living body are left in a wireless signal can be performed without using the Fourier transformation in shorter processing time than that in the case using the Fourier transformation. Further, estimation accuracy can be improved by using a plurality of pieces of differential information. Accordingly, a direction in which a moving body exists can be highly accurately estimated in short observation time corresponding to a cycle derived from activity of the moving body. Thus, a location on which a moving body exists can be highly accurately estimated in a short period of time by using a wireless signal.

Here, evaluation was performed by an experiment so as to confirm the advantageous effect according to the second embodiment. The evaluation will be described below.

Figure 10:
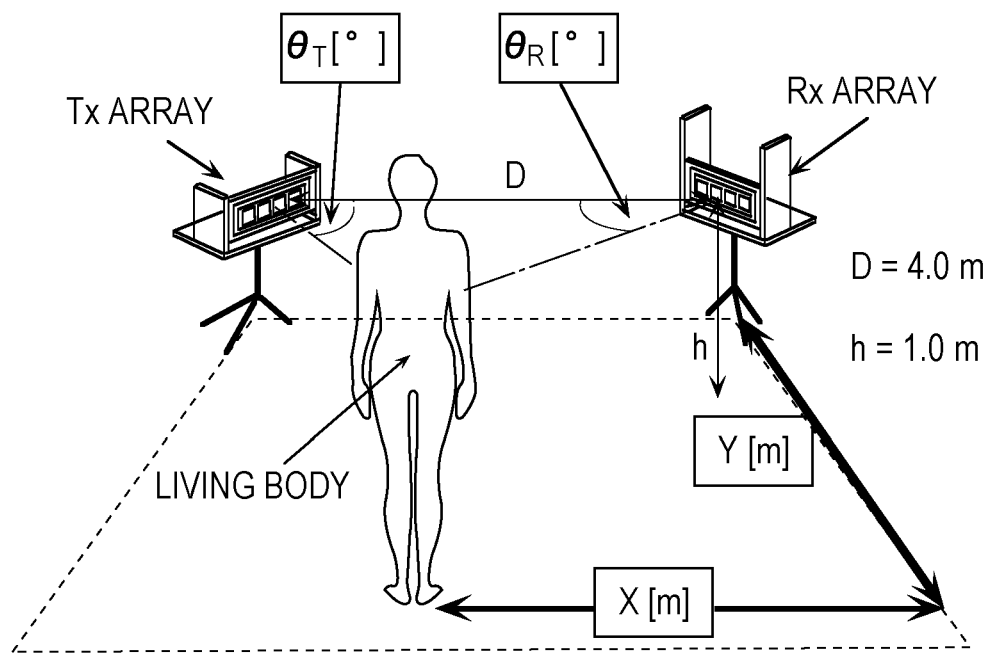
FIG. 10 illustrates a concept of an experiment using the estimation method according to the second embodiment.

FIG. 10 illustrates a concept of an experiment using the estimation method according to the second embodiment.

Both of the transmission array antenna (Tx array) and the reception array antenna (Rx array) which are illustrated in FIG. 10 have the 4×4 multiple input multiple output (MIMO) configuration using a four-element patch array antenna. Further, the single-pole-4-throw (SP4T) switch and a receiver of four systems were disposed respectively on the transmission side and the reception side. In this experiment, measurement of a MIMO channel was performed by using these devices.

Here, the array element interval of the transmission/reception antennas was set to 0.5 wavelength, the transmission-reception distance D was set to 4.0 m, and the antenna height h was set to 1.0 m which is the height of a chest of an erecting human being (living body). A non-modulated continuous wave (CW) of 2.47125 GHz was transmitted from a transmitter, the sampling frequency (channel acquisition speed) was set to 7.0 Hz, and channel measurement time was set to 3.3 seconds. In the channel measurement, there was no person other than a subject and the subject faced the front to a wall on the antenna side.

Figure 11:
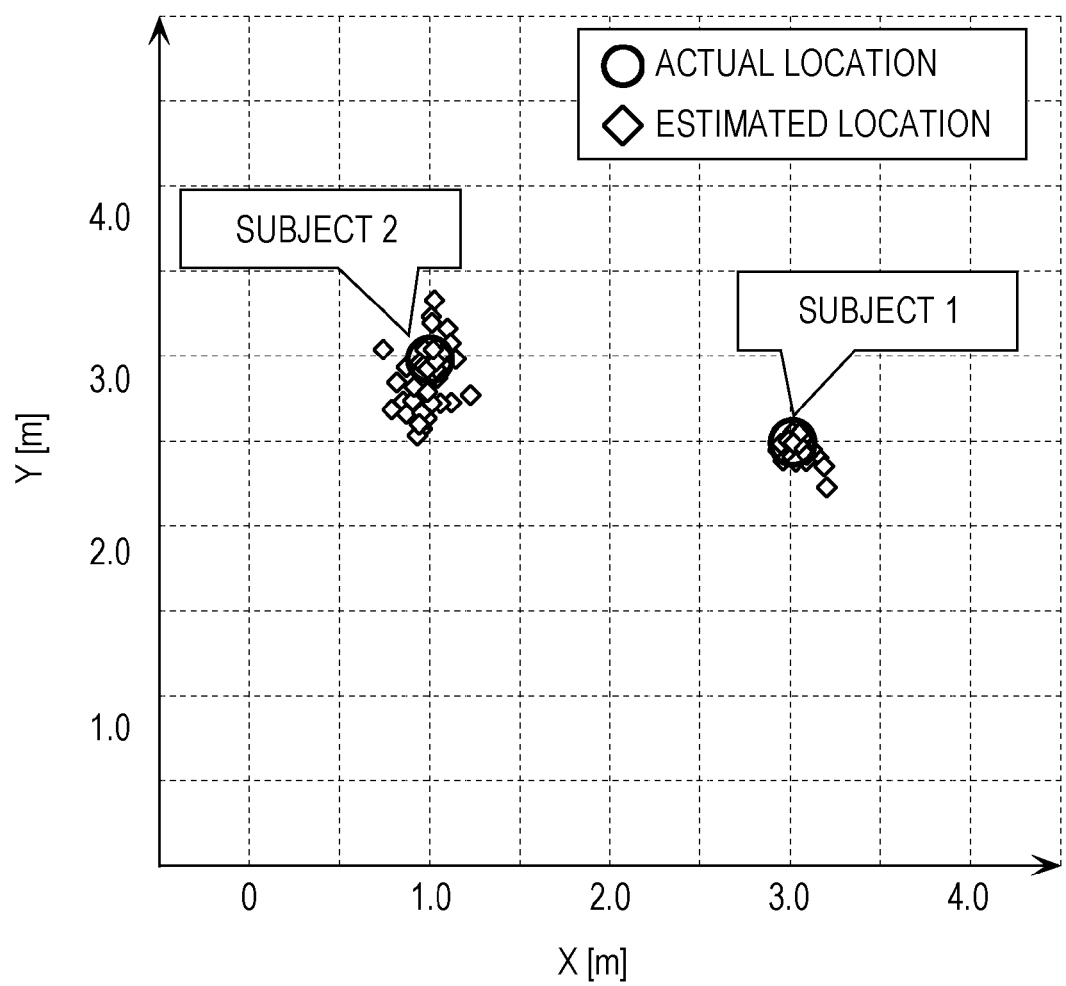
FIG. 11 illustrates a result of an experiment using the estimation method according to the second embodiment.

FIG. 11 illustrates a result of an experiment using the estimation method according to the second embodiment. FIG. 11 illustrates a result of living body location estimation in a case of two subjects. The standing location of the subject 1 was (X=1.0 m, Y=2.5 m) and the standing location of the subject 2 was (X=3.0 m, Y=2.0 m). In FIG. 11, the actual locations of the subjects are marked with a circle and locations of the subjects estimated through search of the local maximal value of an evaluation function are marked with a diamond. As illustrated in FIG. 11, the locations of the subjects estimated through the search of the local maximal values of evaluation functions are close to the actual subjects (living bodies) in the case of two subjects as well. Accordingly, it is understood that the estimation method according to the second embodiment enables estimation of living body locations of a plurality of persons.

Figure 12:
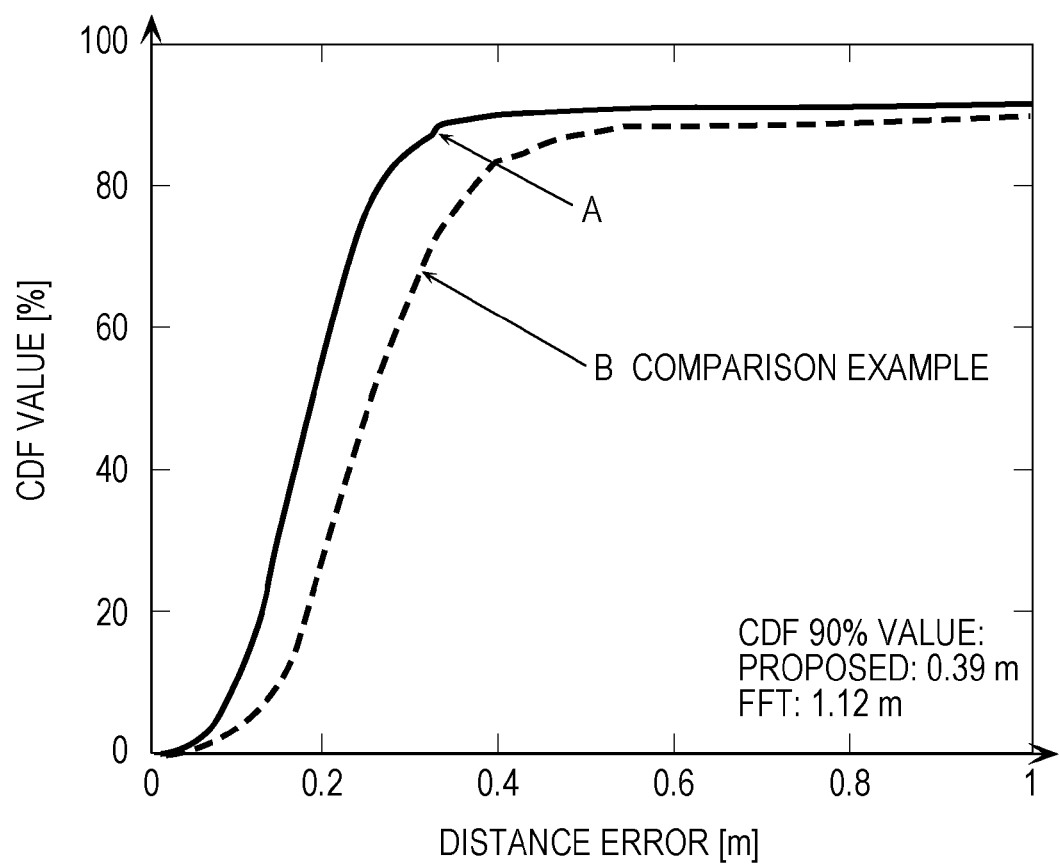
FIG. 12 illustrates a result of another experiment using the estimation method according to the second embodiment.

FIG. 12 illustrates a result of another experiment using the estimation method according to the second embodiment. A solid line A of FIG. 12 indicates a cumulative probability distribution (a cumulative distribution function (CDF)) of location estimation errors when living body location estimation in the case of two subjects was tested 1500 times. The dotted line B of FIG. 12 is shown together as a comparison example which is a result (a cumulative probability distribution of location estimation errors) of the living body location estimation method (the above-mentioned Japanese Unexamined Patent Application Publication No. 2015-117972) using the Fourier transformation which is the method of a related art with respect to a time-variation channel on 3.28 seconds which is a condition of this experiment.

Referring to FIG. 12, the CDF 90% value in the case of the comparison example using the Fourier transformation is 1.12 m and the CDF 90% value in the case of the use of the estimation method according to the second embodiment is 0.39 m. Accordingly, it is understood that the estimation obtained by the estimation method according to the second embodiment is more accurate by 0.73 m. Thus, it is verified that a living body location can be estimated with high accuracy even in short observation time due to the present embodiment.

As described above, according to the present disclosure, by calculating differential information which is difference between propagation channels at two different time points in a predetermined period, signal processing by which only components derived from a living body are left in a wireless signal can be performed without using the Fourier transformation in shorter processing time than that in the case using the Fourier transformation. Further, estimation accuracy can be improved by using a plurality of pieces of differential information. Accordingly, a direction in which a moving body exists can be estimated with high accuracy in short observation time corresponding to a cycle derived from activity of the moving body. Thus, an estimation device and an estimation method can be realized by which a direction and a location on which a moving body exists can be highly accurately estimated in a short period of time by using a wireless signal.

The positioning sensor and the direction estimation method according to one aspect of the present disclosure have been described above based on the embodiments, but the present disclosure is not limited to these embodiments. An aspect in which various modifications conceived by a person skilled in the art are applied to the above embodiments and an aspect constructed by combining components of the different embodiments are also included in the scope of the present disclosure as long as the aspects do not deviate from the purpose of the present disclosure.

For example, in the first and second embodiments, the direction estimation and the location estimation of the living body 50 have been described as examples, but an object is not limited to the living body 50. The present disclosure is applicable to various moving bodies (a machine and so forth) which provide the Doppler effect to a reflection wave by activity thereof in a case where the moving bodies are irradiated with a high frequency signal.

Further, the present disclosure can be realized not only as a positioning sensor which is provided with such discriminative components but also as an estimation method including steps of discriminative components included in the positioning sensor. Further, the present disclosure can be realized also as a computer program causing a computer to execute each discriminative step included in such method. It is needless to say that such computer program can be distributed via a non-temporal recording medium which is readable by a computer such as a CD-ROM or via a communication network such as the Internet.

The present disclosure is applicable to a positioning sensor and a direction estimation method for estimating a direction and a location of a moving body by using a wireless signal, and especially applicable to a positioning sensor, which is mounted on measuring instrument which measures a direction and a location of a moving body such as a living body and a machine, an electrical household appliance which performs control corresponding to a direction and a location of a moving body, a monitoring device which detects intrusion of a moving body, and the like and a direction estimation method.

What is claimed is:

1. A positioning sensor comprising:
    a transmission antenna that transmits a transmission signal to a predetermined area in search of a moving body;
    a plurality of reception antennae, each of which receives a reception signal, one or more of a plurality of the reception signals received includes a reflection signal generated by the moving body reflecting the transmission signal;

a receiver that observes each of the plurality of reception signals in a predetermined sampling cycle in a predetermined period;

a processor; and a memory, wherein the processor calculates a plurality of complex transfer functions, each of the plurality of complex transfer functions representing a propagation characteristics between the transmission antenna and each of the plurality of reception antennae based on each of the plurality of reception signals, records each of the plurality of complex transfer functions in the memory as being associated with each time point at which each of the plurality of reception signals is observed, each of the plurality of reception signals corresponding to each of the plurality of complex transfer functions, extracts, among the plurality of complex transfer functions, a plurality of pairs of two complex transfer functions respectively corresponding to two time points in a predetermined interval, calculates a plurality of pieces of differential information representing a difference between a pair of two complex transfer functions included in each of the plurality of pairs of two complex transfer functions, each of the plurality of pieces of differential information being expressed by a vector of N dimensions, and estimates a direction to a location of the moving body with respect to the positioning sensor based on each of the plurality of pieces of differential information.

2. The positioning sensor according to claim 1, wherein among a plurality of pairs of two time points, each pair of two time points in a predetermined interval includes a first time and a second time, the first time being a point in time that is earlier than the second time, and the first time varies for each of the plurality of pairs of two complex transfer functions.

3. The positioning sensor according to claim 1, wherein the moving body is a living body.

4. The positioning sensor according to claim 3, wherein the predetermined period is approximately a half cycle of at least one of a breathing cycle, a heartbeat, and a body movement of the living body.

5. The positioning sensor according to claim 1, wherein among a plurality of pairs of two time points, each pair of two time points in a predetermined interval includes a first time and a second time, the first time being a point in time that is earlier time than the second time, and the processor for each of the plurality of pairs of two time points, calculates a correlation matrix with respect to a differential time between the second time and the first time based on each of the plurality of pieces of differential information, applies a predetermined method to each of the correlation matrices to estimate an incoming direction of the reflection signal with respect to the positioning sensor, and estimates a direction to a location of the moving body with respect to the positioning sensor based on the incoming direction.

6. The positioning sensor according to claim 5, wherein the predetermined method is a multiple signal classification algorithm.

7. A method for estimating an incoming direction of a signal in a positioning sensor, the positioning sensor including a transmission antenna that transmits a transmission signal to a predetermined area in search of a moving body, a plurality of reception antennae, each of which receives a reception signal, one or more a plurality of the reception signals received includes a reflection signal generated by the moving body reflecting the transmission signal, a receiver that observes each of the plurality of reception signals in a predetermined sampling cycle in a predetermined period, a processor, and a memory, the method comprising:

calculating, by the processor, a plurality of complex transfer functions, each of the plurality of complex transfer functions representing a propagation characteristics between the transmission antenna and each of the plurality of reception antennae based on each of the plurality of reception signals;

recording, by the processor, each of the plurality of complex transfer functions in the memory as being associated with each time point at which each of the plurality of reception signals is observed, each of the plurality of reception signals corresponding to each of the plurality of complex transfer functions;

extracting, by the processor and among the plurality of complex transfer functions, a plurality of pairs of two complex transfer functions respectively corresponding to two time points in a predetermined interval;

calculating, by the processor, a plurality of pieces of differential information representing a difference between a pair of two complex transfer functions included in each of the plurality of pairs of two complex transfer functions, each of the plurality of pieces of differential information being expressed by a vector of N dimensions; and estimating, by the processor, a direction to a location of the moving body, with respect to the positioning sensor based on each of the plurality of pieces of differential information.

* * * * *